(12) United States Patent
Gieseke

(10) Patent No.: US 10,139,137 B1
(45) Date of Patent: Nov. 27, 2018

(54) HEAT EXCHANGER REACTIVE TO INTERNAL AND EXTERNAL TEMPERATURES

(71) Applicant: Thomas J Gieseke, Warren, RI (US)

(72) Inventor: Thomas J Gieseke, Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/628,184

(22) Filed: Jun. 20, 2017

(51) Int. Cl.
| | | |
|---|---|---|
| G05D 23/00 | (2006.01) | |
| F24S 70/25 | (2018.01) | |
| F02G 1/044 | (2006.01) | |
| B32B 15/01 | (2006.01) | |
| F28D 15/02 | (2006.01) | |
| F15B 1/02 | (2006.01) | |
| F25B 30/00 | (2006.01) | |

(52) U.S. Cl.
CPC .............. F24S 70/25 (2018.05); B32B 15/01 (2013.01); F02G 1/044 (2013.01); F28D 15/0208 (2013.01); F15B 1/02 (2013.01); F25B 30/00 (2013.01); *F28D 2015/0291* (2013.01)

(58) Field of Classification Search
CPC .............. F28D 15/046; F28D 15/0241; F28D 15/0275; F28D 15/04; F28D 15/0208; F28D 2015/0291; F24S 70/25; B32B 15/01; F02G 1/044; F15B 1/02; F25B 30/00

USPC ........................................................ 165/287
See application file for complete search history.

(56) References Cited

U.S. PATENT DOCUMENTS

| 4,815,529 A * | 3/1989 | Miyazaki ................ F28D 15/04 122/366 |
|---|---|---|
| 2007/0240851 A1* | 10/2007 | Liu ...................... F28D 15/0275 165/104.14 |
| 2007/0277963 A1* | 12/2007 | Hou ....................... F28D 15/046 165/104.26 |
| 2008/0099186 A1* | 5/2008 | Yu ........................ F28D 15/0241 165/104.11 |
| 2017/0234625 A1* | 8/2017 | Inagaki ................. F28D 15/046 165/104.26 |

* cited by examiner

*Primary Examiner* — Davis Hwu
(74) *Attorney, Agent, or Firm* — James M. Kasischke; Michael P. Stanley

(57) ABSTRACT

The present invention includes a heat exchanger reactive to external and internal temperatures for carrying a working fluid, including two pairs of nested pipes; each pair including one pipe with a channel portion and a stress relief portion and a second pipe with just a channel portion, one of said pipes enclosing the other with an interference fit and both pipes having different coefficients of thermal expansion. The first pair of pipes positioned co-axially with and encompassing the second pair. A fluid is positioned in the space defined by the inner surface of outer pair of pipes and the outer surface of inner pair of pipes. The two pipe pairs have positions responsive to the internal and external temperatures in which the space defined by pipe pairs is either minimized or maximized by expansion and contraction of the pipe pairs caused by differences in coefficients of thermal expansion.

9 Claims, 17 Drawing Sheets

HEAT EXCHANGER REACTIVE TO INTERNAL AND EXTERNAL TEMPERATURES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to a system for harvesting thermal energy from the environment and more particularly to such a system that utilizes a heat engine to convert thermal energy to mechanical energy.

(2) Description of the Prior Art

Thermal energy harvesting systems extract thermal energy from high temperature areas of the environment in order to drive thermo-mechanical engines that perform work. These energy harvesting systems require a high temperature source, a low temperature sink, and a heat engine to convert thermal energy to mechanical energy as heat is transferred from the high temperature source to the low temperature sink. The kinetic energy produced by the heat engine drives electro-mechanical devices that generate electricity or perform work. Heat exchanger elements are employed at the high temperature source and the low temperature sink in order to transfer energy into and out of working fluids contained in the heat exchanger elements. The thermal energy in the working fluid drives the heat engine.

Thermal energy that can be harvested is available in many locations of the environment. Solar energy can be collected in absorber plates or by focusing light energy on a heat exchanger containing a working fluid. Geothermal energy can be collected at thermal vents (on land or in the ocean) by passing a heat exchanger element over or through the thermal vent or by running a heat exchanger deep in the Earth where the ambient temperature is high. Also, ocean thermoclines can be exploited by absorbing energy from warm water at the ocean surface.

To convert thermal energy to mechanical energy, the energy absorbed from the high temperature source must be used in a heat engine that converts a portion of the available thermal energy into mechanical work and rejects the balance of the energy to the low temperature sink. Suitable heat sinks include the Earth, a cool body of water, a radiator, and the atmosphere.

Heat engines take advantage of a temperature difference between a high temperature source and a low temperature sink to perform work in numerous ways. Modern systems include the use of thermo-constrictive materials, piezoelectrics, and shape memory alloys to convert material shape changes that are realized as the materials are cyclically heated and cooled into mechanical work. More traditional systems, such as the Stirling engine (described by James Senft in "An Introduction to Low Temperature Differential Stirling Engines", Moriya Press 1996) use expansion, contraction, condensation, and evaporation of a working fluid to drive a piston or spin a turbine in a mechanical system.

Using technology that exists in the prior art, energy harvesting systems require separate heat exchangers for the heat absorption portion of the cycle (at the high temperature source) and the heat rejection portion of the cycle (at the low temperature sink). To meet this requirement, the systems need to be configured so that the heat exchanger used for energy absorption is placed at the high temperature source and the heat exchanger used for waste energy rejection is placed at the low temperature sink. A variety of suitable heat exchanger designs are known in the art for use in a system of this type.

The use of pipe is one such heat exchanger design known in the art. Pipe is a common element of numerous complex heat exchanger designs. In operation, heat is transferred to or from the environment, through the walls of the pipe and into or out of a working fluid inside of the pipe. Clusters of pipe are commonly placed in banks to form a radiator or are stretched over a comparatively long length where the length of the pipe provides a large surface area for enhanced heat transfer. If fluid in the pipe is hotter than the ambient temperature, heat will be transferred from the working fluid to the environment. Alternately, if the fluid in the pipe is cooler than the ambient temperature, the pipe will absorb energy from the environment.

A heat exchanger of this type does not preferentially absorb or reject heat from the environment. The resistance to a flow of heat is not direction dependent. Consequently, to extract thermal energy from the high temperature source and to reject waste energy to the low temperature sink; one heat exchanger must be precisely placed at the location of the high temperature source and another heat exchanger must be precisely placed at the location of the low temperature sink.

A heat exchanger element that is partially in contact with the high and low temperature areas would not function effectively to either extract or reject energy from the environment. The exchanger element would reject some energy to the low temperature areas and would absorb some energy from the high temperature areas; thereby yielding a low net energy transfer. If a single conventional heat exchanger element were deployed without regard to the location of the high temperature source and the low temperature sink, following a random path through the environment, it would not be possible to determine a-priori if the working fluid would realize a net increase or decrease in thermal energy as a result of heat transfer to the environment.

The requirement for precise heat exchanger placement does not present a problem when the location and time of existence of the high temperature source and low temperature sink are fixed and known. However, if the location of the high temperature source and low temperature sink move spatially over time or are unknown at the time of deployment, a strategy must be employed to precisely place and move conventional heat exchangers as conditions vary. There are circumstances where this strategy is not practical and others where the strategy is not possible. In those circumstances, a means to modify the structure of the heat exchanger in response to environmental conditions such that it performs differently in different conditions would be advantageous.

Bi-metallic structures are well known in the art in which the structures deform when heated or cooled. In this context, a bi-metallic structure is defined as a structure comprised of two sheets of material with different coefficients of thermal expansion bonded at their surface. When heated, the sheet with a larger coefficient of thermal expansion expands more than the sheet with a lower coefficient of thermal expansion. Because the sheets are bonded at a common face, the sheets cannot move relative to one another along the common face as the shapes of the sheets change. As a result, the sheets deform to relieve the thermally induced stress.

Bi-metallic structures are used in valves, switches, and other mechanical systems in which structural changes are needed in response to changing thermal conditions. In Riordan (U.S. Pat. No. 3,225,820), a bi-metallic strip is described that deforms under changing thermal conditions to control the thermal resistance between two parts.

SUMMARY OF THE INVENTION

It is therefore a general purpose and primary object of the present invention to provide an energy harvesting system that extracts thermal energy from high temperature areas of the environment in order to run a heat engine and rejects waste energy to low temperature areas of the environment.

It is a further object of the present invention to provide heat exchanger piping passing through the environment that absorbs heat into a working fluid moving through the piping from high temperature regions of the environment without losing heat to low temperature areas of the environment.

It is a still further object of the present invention to provide heat exchanger piping passing through the environment that rejects heat to low temperature regions of the environment from a working fluid moving through the piping without absorbing heat from high temperature areas of the environment.

It is a still further object of the present invention to place piping that absorbs energy from the environment and piping that rejects energy to the environment along paths that start and end at a heat engine.

It is a still further object of the present invention to provide a heat engine to use energy returned from piping that absorbs heat from the environment to perform mechanical work while rejecting waste heat to the fluid returned from piping that transfers heat to the environment.

To attain the objects described, the present invention combines components suitable for: absorbing heat from high temperature areas of the environment; rejecting heat to low temperature areas of the environment; and converting temperature differences in working fluids to mechanical work.

The present invention includes a heat exchanger reactive to external and internal temperatures for carrying a working fluid, including a first pipe with a first coefficient of thermal expansion and a cross-section with a first channel portion and a first stress relief portion. The first pipe is provided for containing the working fluid within the inner surface thereof.

A second pipe is provided with a second coefficient of thermal expansion and a cross section with a second channel portion with the second pipe enclosing the first pipe. The inner surface of the second pipe is in contact with the outer surface of the first pipe as an interference fit.

A third pipe with a third coefficient of thermal expansion encloses the second pipe with the third pipe having a cross-section with a third channel portion. A fourth pipe and with a fourth coefficient of thermal expansion includes a cross-section with a fourth channel portion and a fourth stress relief portion parallel to an axis of the fourth pipe with the fourth stress-relief portion having a volume and protruding away from the axis of the first pipe. The fourth pipe is positioned co-axially with and encompassing the third pipe such that the inner surface of the fourth pipe is in contact with the outer surface of the third pipe with an interference fit.

A fluid is positioned in the space defined by the inner surface of the third pipe and the outer surface of the second pipe. The first, second, third and fourth pipes have a first position responsive to internal and external temperatures in which the space defined by the second and third pipes is minimized. The second position is responsive to different internal and external temperatures in which the space defined between the second and third pipes is maximized by expansion and contraction of the first, second, third and fourth pipes caused by differences in coefficients of thermal expansion.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Systems and techniques exist for capturing thermal energy from the environment to drive heat engines that perform mechanical work. The present invention is in this general category of device but utilizes a novel set and arrangement of components. These components allow the device to be used where a location of high and low temperature pockets in the environment is unknown or changing.

Figure 1:
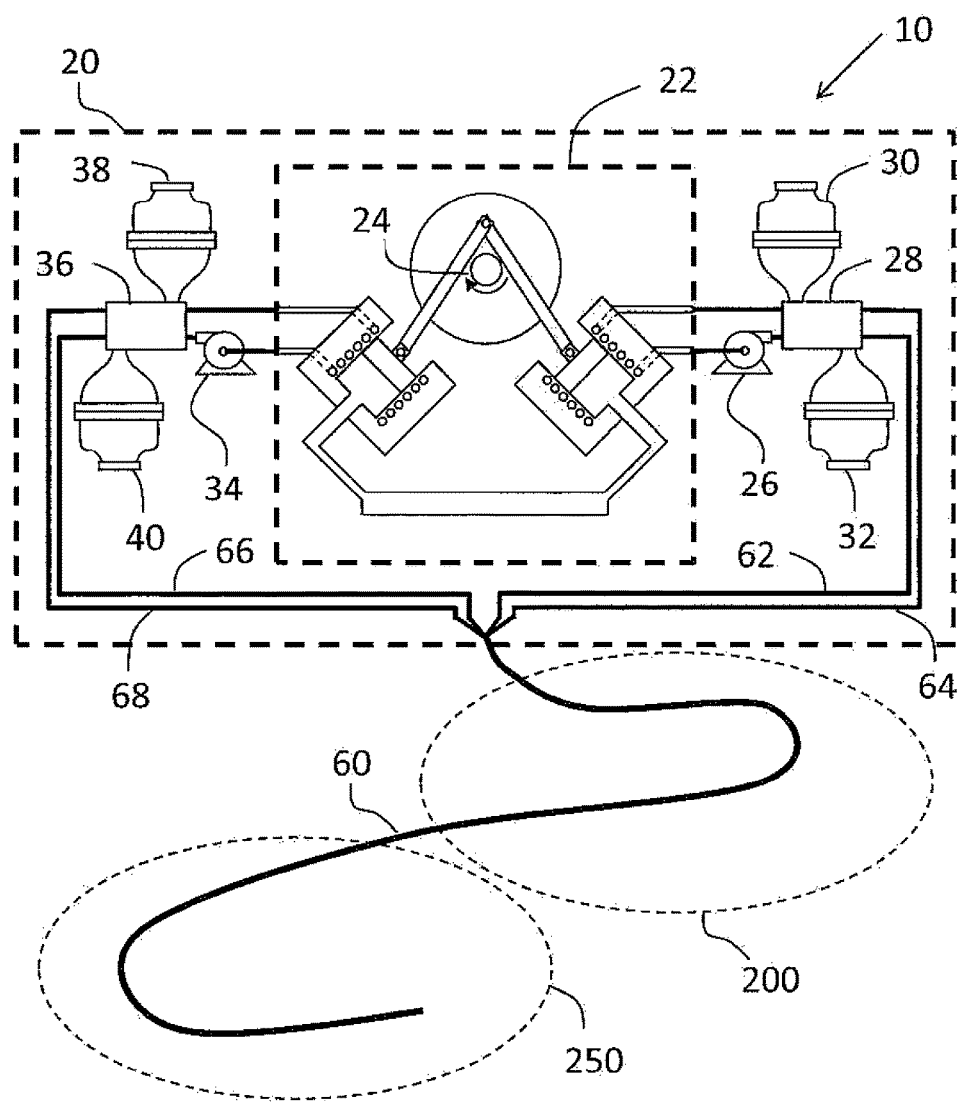
FIG. 1 depicts a diagram of the energy harvesting system of the present invention with heat exchanger elements distributed in an environment having time and space varying high temperature and low temperature areas.

FIG. 1 depicts an energy harvesting system 10 of the present invention. The energy harvesting system 10 includes two major components. The first component is an energy conversion system 20. The energy conversion system 20 includes a heat engine 22 with an output shaft 24, a heat rejection circuit pump 26, a heat rejection line manifold 28, a heat rejection line pressure balance accumulator 30, a heat rejection line low thermal conductivity fluid accumulator 32, a heat absorbing line circuit pump 34, a heat absorption line manifold 36, a heat absorption line pressure balance accumulator 38, and a heat absorption line low thermal conductivity fluid accumulator 40. While the heat engine 22 is depicted as an alpha-type Stirling engine, the engine could be a variety of different engines including a beta-Stirling engine, Malone engine, or phase changing engine such as a Rankine engine.

The second major component of the energy harvesting system 10 is a Selective Heat Absorption and Rejection Pipe (SHARP) heat exchanger 60. The SHARP heat exchanger 60 includes a heat rejection supply line 62, a heat rejection return line 64, a heat absorption supply line 66, and a heat absorption return line 68. These lines are bundled together to form the SHARP heat exchanger 60. The SHARP heat exchanger 60 is designed to follow a path through a low temperature area of the environment and a high temperature area of the environment.

Figure 2:
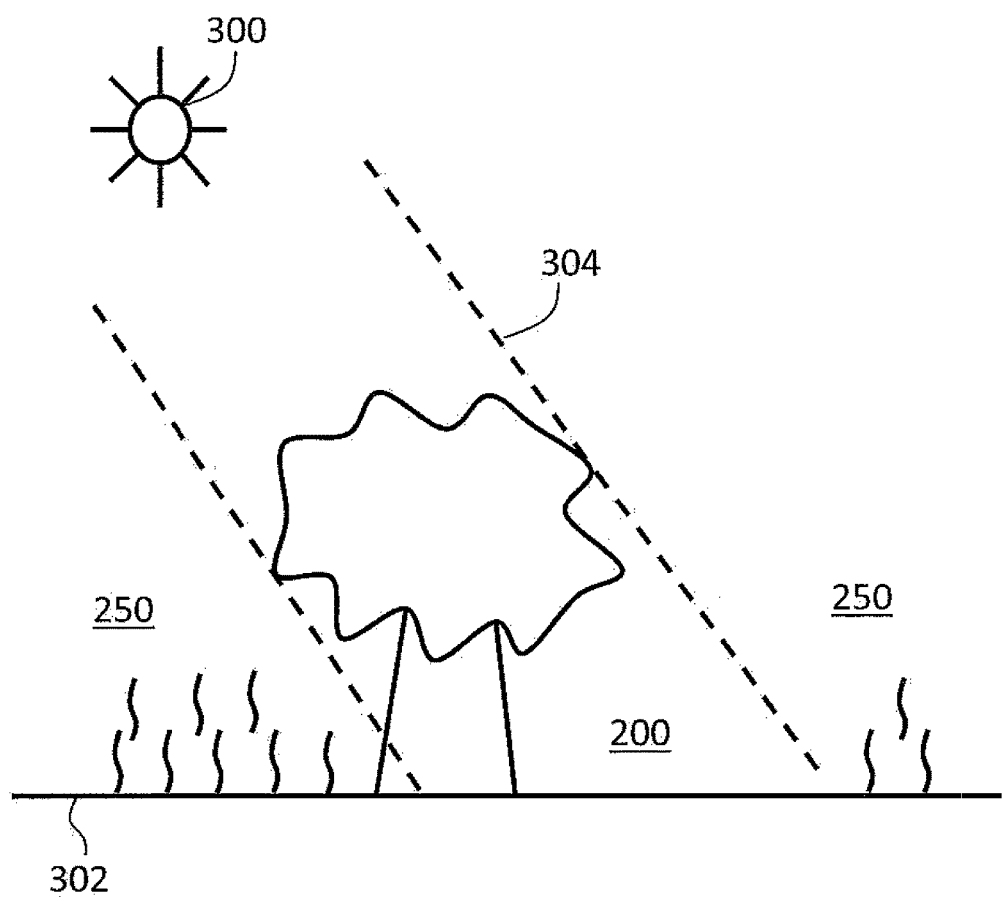
FIG. 2 depicts an environment with time and space varying solar heated high temperature areas and low temperature areas in the shade of trees with solar radiation indicated in the figure.

A representative environment where the location of hot and cold area change is shown in FIG. 2. In this environment, the sun 300 non-uniformly heats the earth 302. Where sunlight 304 strikes the earth 302 directly, the high temperature area 250 of the environment is created. In regions of shade, the sunlight 304 is blocked and the low temperature area 200 of the environment is created.

Figure 3:
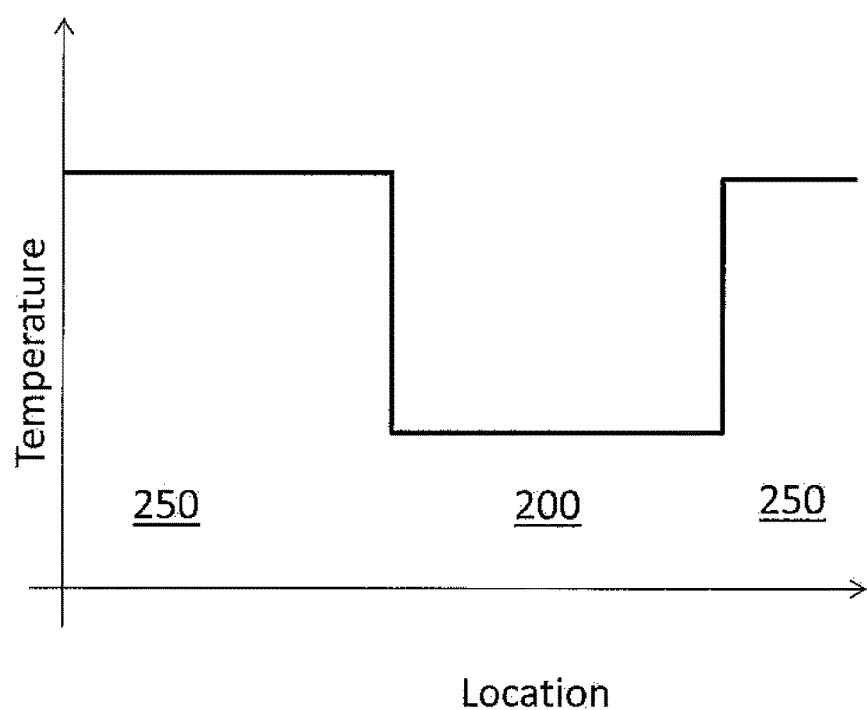
FIG. 3 depicts the thermal distribution associated with the environment of FIG. 2.

The temperature distribution along a path extending from the left side of the environment to the right side of the environment is shown in FIG. 3. Interpreting the temperature distribution shown in the figure, it would be possible to place a heat absorber in the high temperature area 250 to collect thermal energy that could be used to run an engine provided that a second heat exchanger is placed in the low temperature area 200 to reject waste heat. However, as the sun 300 moves over the course of the day, the areas of the earth 302 that are heated would change (See FIG. 4).

Figure 4:
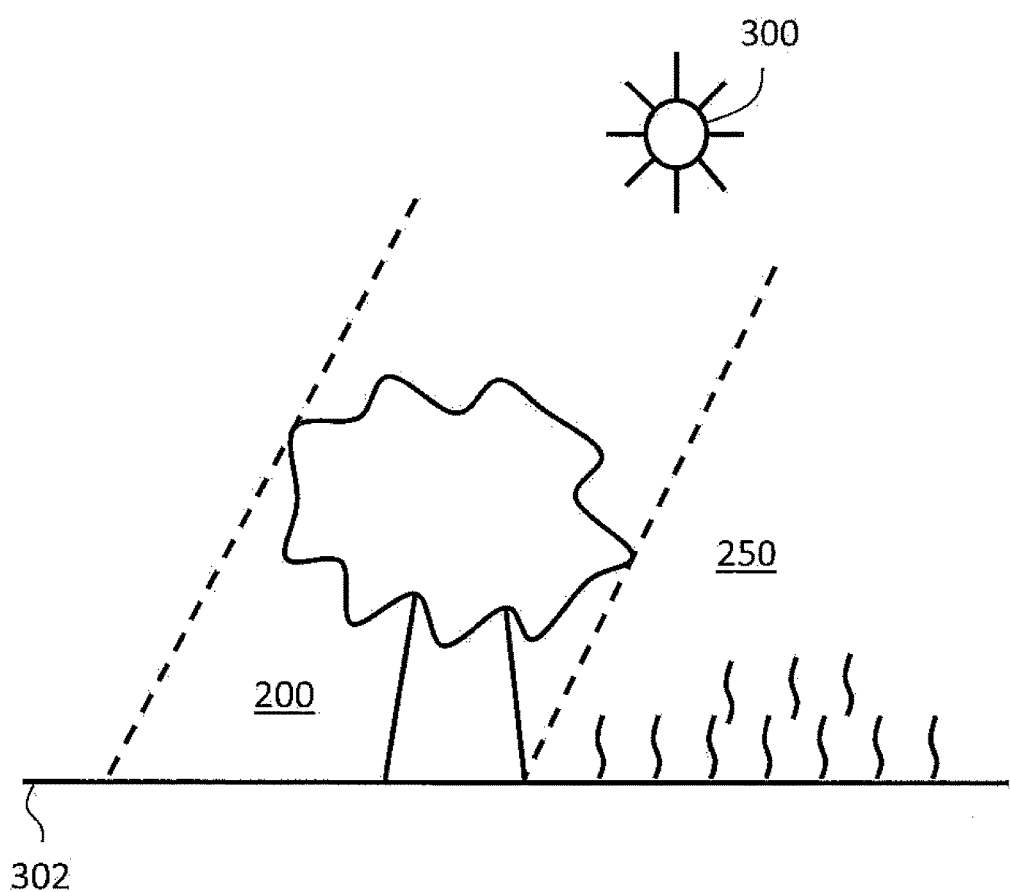
FIG. 4 depicts the same environment as FIG. 2 with high temperature and low temperature areas, with solar radiation indicated in the figure as would be realized at a different time of day than FIG. 2.
Figure 5:
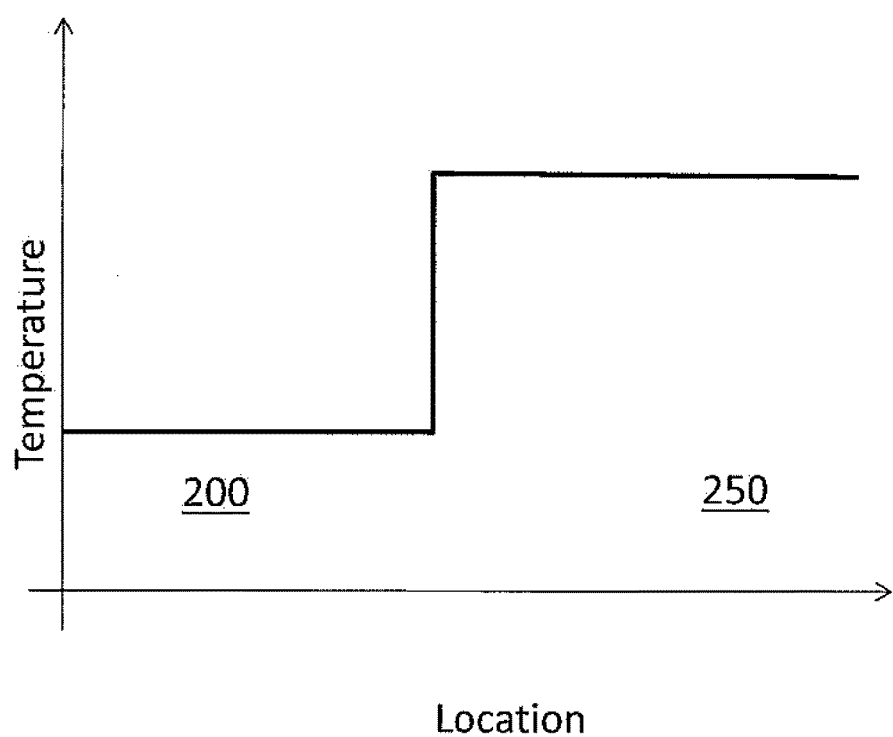
FIG. 5 depicts the thermal distribution associated with the environment of FIG. 4.

In the representation of FIG. 4, areas that were hot (heated) are now cool and areas that were cool are now hot. FIG. 5 shows the thermal distribution in the environment associated with FIG. 4. If heat exchangers had been placed based on the thermal distribution of FIG. 2, the heat exchangers would now be incorrectly placed to capture available thermal energy under the conditions shown in FIG. 4.

Figure 6:
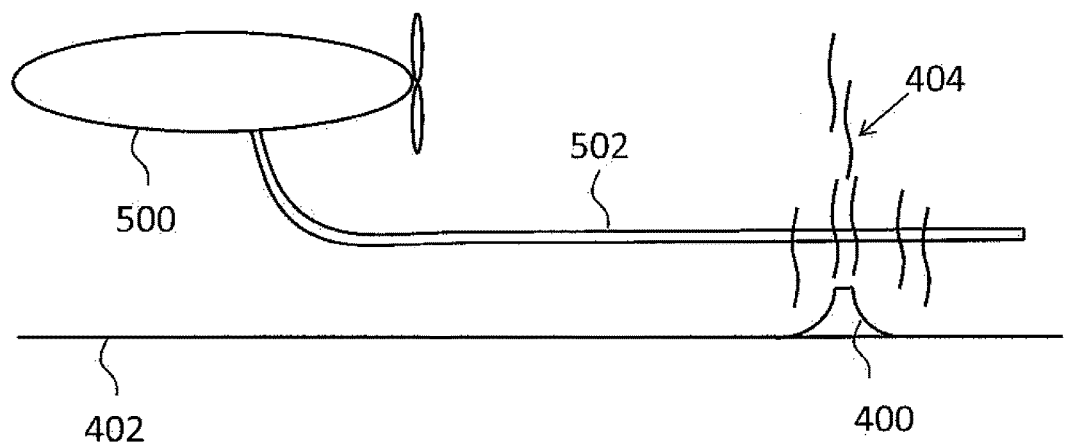
FIG. 6 depicts an undersea vehicle towing a heat exchanger element through an environment with a localized high temperature source.

In FIG. 6, a similar hot/cold environment is depicted where a thermal vent 400 exists on the ocean floor 402 in which the thermal vent 400 creates a hot jet of fluid 404 and an associated high temperature area in the environment. An undersea vehicle 500 is shown that could benefit by absorbing heat from the hot jet of fluid 404 for use in generating on-board power. In this situation, it would be challenging for the undersea vehicle 500 to position and hold a heat exchanger element 502 in the hot jet of fluid 404, especially if the undersea vehicle was in motion. It would be advantageous if the heat exchanger element 502 could be designed to capture energy from the hot jet of fluid 404, even if not positioned optimally, without losing energy to low temperature areas of the environment.

Figure 7:
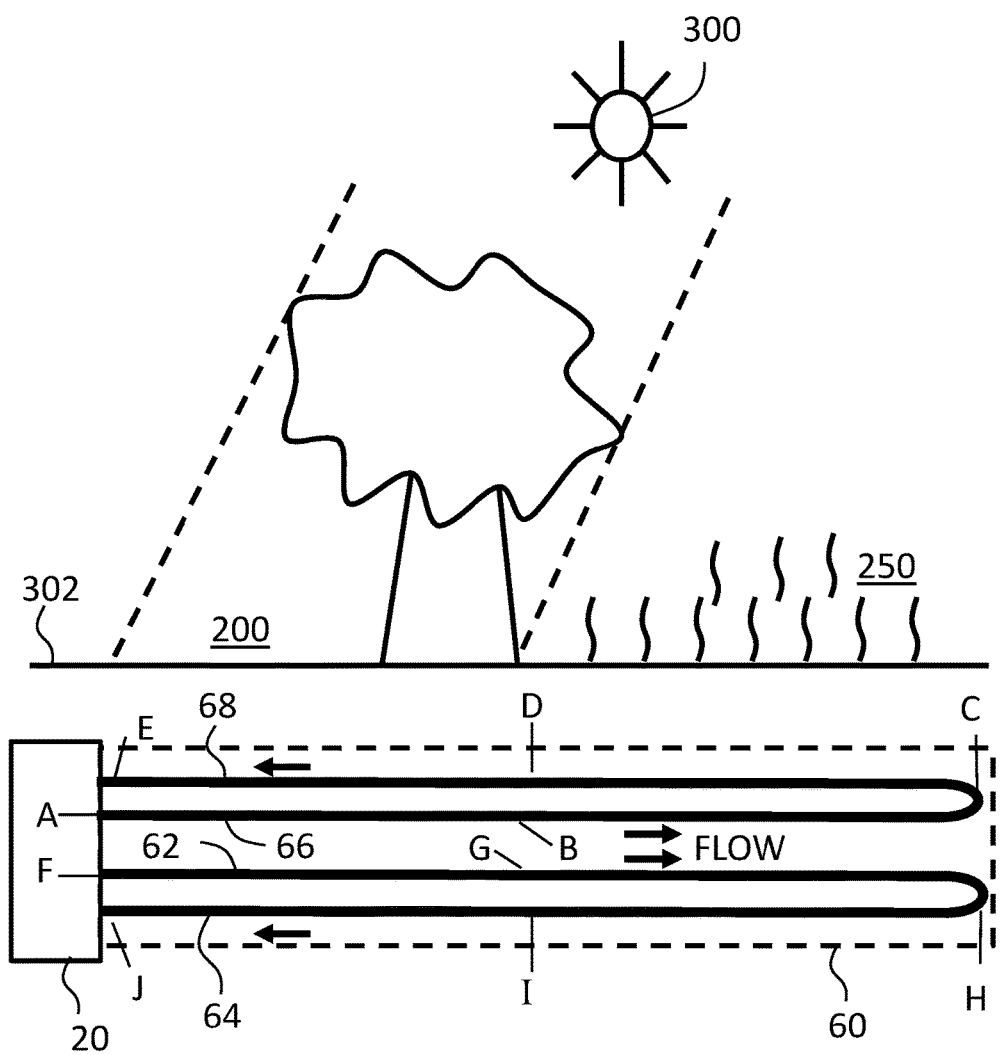
FIG. 7 depicts the path that a heat exchanger element could take through the environment depicted in FIG. 4.

In FIG. 7, the energy conversion system 20 and the SHARP heat exchanger 60 are shown as the system and heat exchanger would be deployed in the environment of FIG. 4. In the figure, the SHARP heat exchanger 60 is placed along a path that travels through the low temperature area 200 of the environment and the high temperature area 250 of the environment. Working fluid 100 (See FIG. 9) is forced through the heat rejection supply line 62 and the heat absorption supply line 66 starting at point F and A respectively and subsequently passing through points G and B, and H and C. The working fluid 100 returns to the energy conversion system 20 at point J and E in heat rejection return line 64 and heat absorption return line 68, respectively, while passing through point I and D.

It is useful to first consider the expected heat exchange process if a traditional pipe were used in a SHARP heat exchanger 60 as the heat absorption supply line 66 and the heat absorption return line 68 or the heat rejection supply line 62 and the heat rejection return line 64. If the heat absorption supply line 66 and the heat absorption return line 68 are considered in such a heat exchanger, when the working fluid 100 leaves the energy conversion system 20, the working fluid is at a temperature approximately equal to the average temperature of the environment.

The working fluid 100 in the traditional pipe moves through the section of the heat absorption supply line 66 between points A and B, where the working fluid is hotter than the ambient temperature. The working fluid 100 then loses energy to the low temperature area 200 of the environment and the temperature of the working fluid decreases. As the working fluid 100 continues through the heat absorption supply line 66 from point B to point C, the working fluid absorbs energy from the high temperature area 250 of the environment.

The fluid path reverses at point C and the working fluid 100 returns in the heat absorption return line 68 through the high temperature area 250 of the environment, continuing to absorb energy as the working fluid travels to point D. Between points D and E, absorbed energy is rejected to the low temperature area 200 of the environment.

Figure 8:
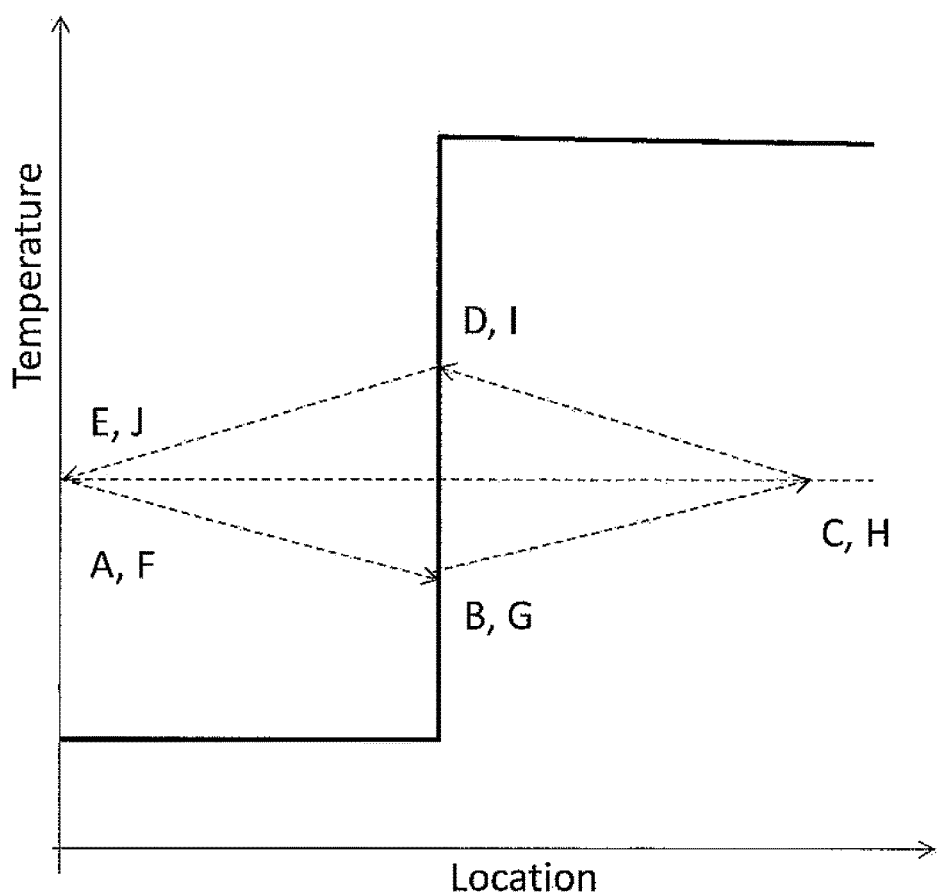
FIG. 8 depicts the temperature variation that a working fluid in a conventional heat exchanger would experience if the heat exchanger followed the path depicted in FIG. 7.

FIG. 8 shows the temperature variation that would be realized in the working fluid 100 as the fluid travels along the path depicted in FIG. 7 and if the SHARP heat exchanger 60 was replaced with standard or traditional piping.

Figure 9:
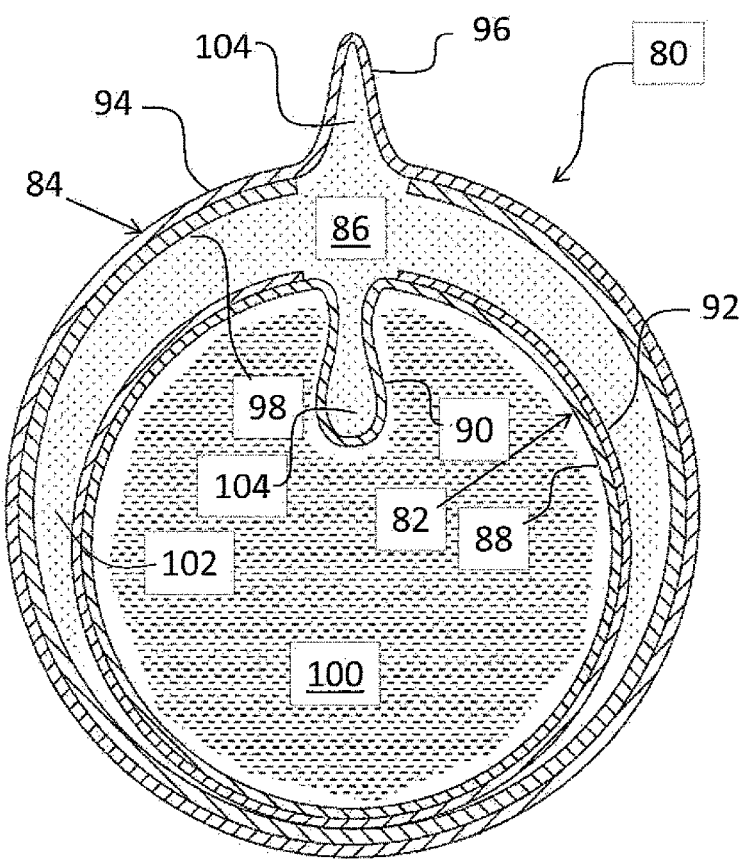
FIG. 9 depicts a cross-section of a selective heat absorption and rejection pipe of the present invention.

The heat exchange behavior described above is altered by employing a Variable Thermal Resistivity Pipe 80, termed VTRP for convenience, a cross section of which is depicted in FIG. 9. The VTRP 80 is comprised of an inner bi-metallic pipe 82, an outer bi-metallic pipe 84, and low thermal conductivity fluid 86.

The inner bi-metallic pipe 82 is further comprised of an internal pipe 88 with an integral stress-relieving inward-extending discontinuity 90. In the preferred embodiment, the inward-extending discontinuity 90 is an integral part of the internal pipe 88. Alternatively, the inward-extending discontinuity can be formed from an elastomer material. An external semi-circular pipe 92 is press fit around the exterior of the internal pipe 88 such that the external semi-circular pipe is in contact with the internal semi-circular pipe. The pressure of an interference fit and static friction prevent slip between the external semi-circular pipe 92 and the internal pipe 88. Therefore, compression between the external semi-circular pipe 92 and the internal pipe 88 results in an effective bond between the surfaces. This bond can be improved through the use of adhesives.

The internal pipe 88 and the external semi-circular pipe 92 are made of dissimilar materials with different coefficients of thermal expansion. Typical metals used in bimetallic structures as metals with high coefficients of thermal expansion are Aluminum and Tin. A typical metal used in bimetallic structures as a metal with low coefficient of thermal expansion is steel.

The radius of the inner bi-metallic pipe 82 will change when heated or cooled. The direction and magnitude of radial change in response to temperature variation depends on the specific materials selected, the coefficients of thermal expansion for the selected materials, the wall thickness of the internal and external semi-circular pipes, and the effectiveness of the stress relieving pipe discontinuity to allow radial expansion.

Similar to the inner bi-metallic pipe 82, the outer bi-metallic pipe 84 is comprised of a second external pipe 94 with an integral stress-relieving outward-extending discontinuity 96. In the preferred embodiment, the outward-extending discontinuity 96 is an integral part of the second external pipe 94. Alternatively, the outward-extending discontinuity can be formed from an elastomer material. A second internal semi-circular pipe 98 is press fit into the interior of the second external pipe 94 such that the second internal semi-circular pipe is in contact with the second external semi-circular pipe. The second external pipe 94 and the second internal semi-circular pipe 98 are made of dissimilar materials, each material with a different coefficient of thermal expansion.

The expansion and contraction behavior of the inner bi-metallic pipe 82 is a function of the average temperature of the bi-metallic pipe relative to a design temperature and the internal semi-circular pipe 88 and the external semi-circular pipe 92 design characteristics. The average temperature of the inner bi-metallic pipe 82 is a value between the temperature of the environment and the temperature of the working fluid 100 contained in the inner bi-metallic pipe; but the temperature of the inner bi-metallic pipe is closer to the temperature of the working fluid than to the temperature of the environment.

If the coefficient of thermal expansion of the internal pipe 88 is less than the coefficient of thermal expansion of the external semi-circular pipe 92 then the radius of the inner bi-metallic pipe 82 will decrease with an increased temperature of the working fluid 100. Conversely, if the coefficient of thermal expansion of the internal pipe 88 is greater than the coefficient of thermal expansion of the external semi-circular pipe 92 then the radius of the inner bi-metallic pipe 82 will increase with an increased temperature of the working fluid 100. The inward-extending discontinuity 90 permits the inner bi-metallic pipe 82 to expand by opening the gap in the semi-circular shape rather than expanding as a result of circumferential growth.

The expansion and contraction behavior of the outer bi-metallic pipe 84 is a function of its average temperature relative to a design temperature and of the second internal semi-circular pipe 98 and second external pipe 94 design characteristics. The average temperature of the outer bi-metallic pipe 84 is a value between that of the environment and the working fluid 100 but closer to the temperature of the environment than to the temperature of the working fluid. If the coefficient of thermal expansion of the second internal semi-circular pipe 92 is less than the coefficient of thermal expansion of the second external pipe 94, the radius of the outer bi-metallic pipe 84 will decrease with an increased temperature of the environment.

Conversely, if the coefficient of thermal expansion of the second internal semi-circular pipe 98 is greater than the coefficient of thermal expansion of the second external pipe 94, the radius of the outer bi-metallic pipe 84 will increase with an increased temperature of the environment. The outward-extending discontinuity 96 permits the outer bi-metallic pipe 84 to expand by opening the gap in the semi-circular shape rather than expanding as a result of circumferential growth.

The space between the inner bi-metallic pipe 82 and the outer bi-metallic pipe 84 is filled with low thermal conductivity fluid 86. The low thermal conductivity fluid 86 resists heat flow in or out of working fluid 100 proportionally to the volume of a fluid filled gap 102 between the inner bi-metallic pipe 82 and the outer bi-metallic pipe 84. An insulating effect is greatest when the fluid filled gap 102 between the inner bi-metallic pipe 82 and the outer bi-metallic pipe 84 is increasingly larger.

The low thermal conductivity fluid 86 is selected based on engineering constraints and operating temperatures. For optimal performance, a liquid or gas with a low thermal conductivity (relative to the pipe materials) should be selected. Common oils have thermal conductivity of approximately twenty percent of the thermal conductivity of water. The thermal conductivity of the common oils is several hundredths of that of metals. Common oils are also viscous; thus common oils offer a further benefit of resisting convective heat transfer through the fluid filled gap 102. A known common oil is mineral oil.

In the state depicted in FIG. 9, where the inner bi-metallic pipe 82 and the outer bi-metallic pipe 84 are not in complete contact with each other, heat transfer between the working fluid 100 and the environment is impeded by the low conductivity fluid 86 in the fluid filled gap 102.

Figure 10:
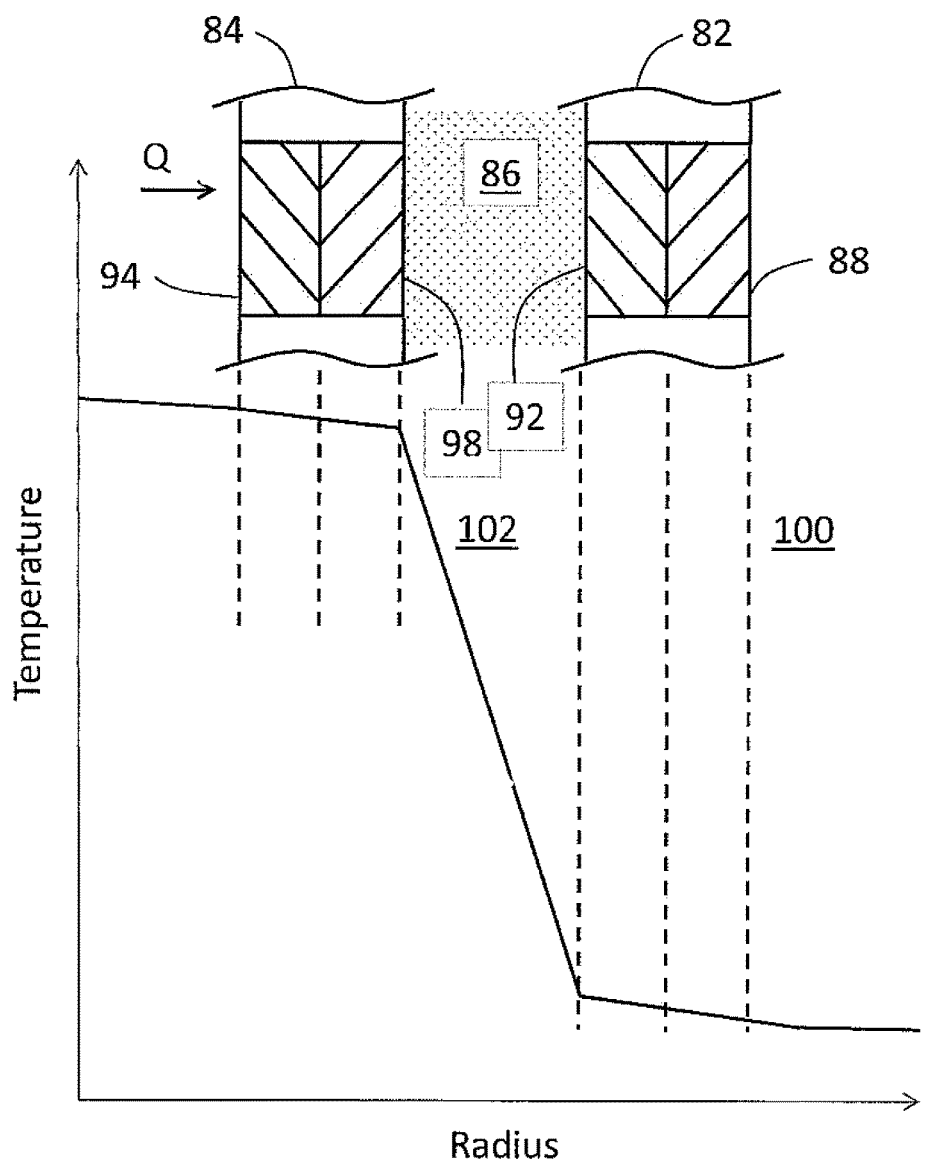
FIG. 10 depicts a temperature distribution through a wall of the selective heat absorption and rejection pipe with a gap between the inner bi-metallic pipe and the outer bi-metallic pipe.

FIG. 10 depicts the temperature distribution through the pipe walls 82 and 84 and the fluid filled gap 102. The convective heat transfer coefficient between the working fluid 100 and the inner bi-metallic pipe 82, the conductive heat transfer coefficient through the inner bi-metallic pipe, the conductive heat transfer coefficient through the outer bi-metallic pipe 84, and the convective heat transfer coefficient between the environment, and the outer bi-metallic pipe are comparatively high. However, the conductive heat transfer coefficient through the low thermal conductivity fluid 86 in the fluid filled gap 102 is low and hence the net heat transfer (noted as Q in FIG. 10) through the pipe wall from the environment and into the working fluid 100 is low.

The variable thermal conductivity feature of the current invention is realized when relative expansion and contraction of the inner bi-metallic pipe 82 and outer bi-metallic pipe 84 changes the thickness of the fluid filled gap 102 between the pipes. When the inner bi-metallic pipe 82 expands and the outer bi-metallic pipe 84 contracts in response to thermal conditions, the low thermal conductivity fluid 86 between the pipes is forced out of the fluid filled gap 102 and into a channel 104 created by the outward-extending discontinuity 96 and the inward-extending discontinuity 90. The pipes 82 and 84 then come into contact with each other as depicted in FIG. 11.

Figure 11:
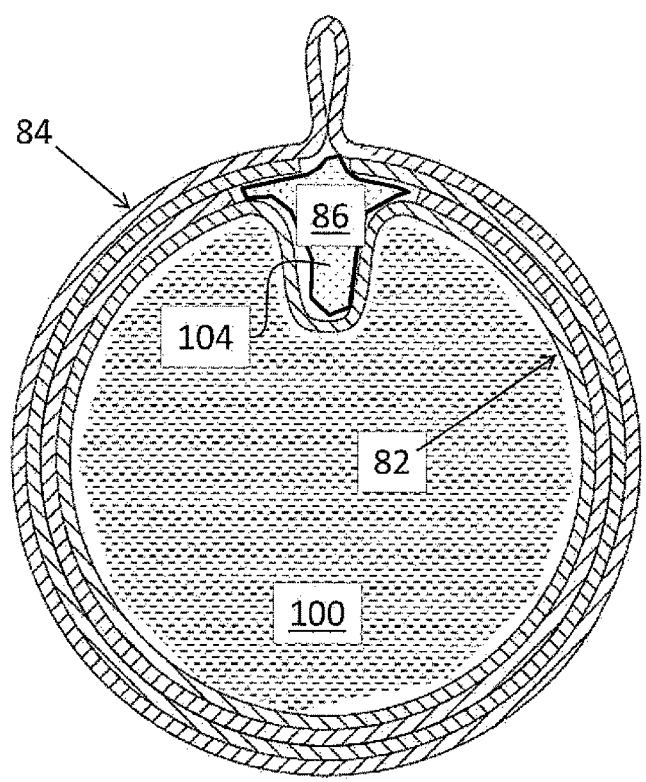
FIG. 11 depicts a cross-section of the selective heat absorption and rejection pipe.
Figure 12:
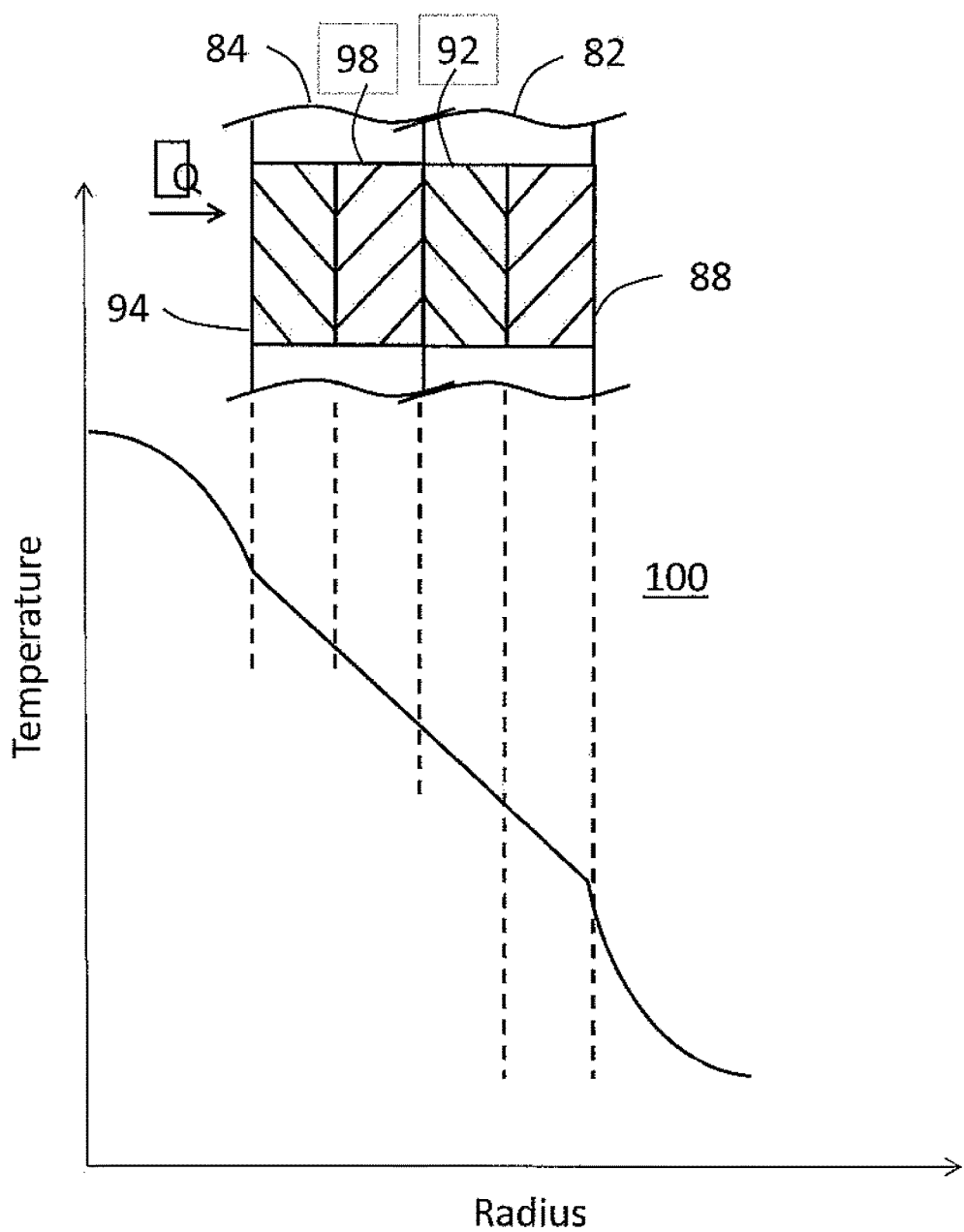
FIG. 12 depicts the temperature distribution through the selective heat absorption and rejection pipe with a minimized gap between the inner bi-metallic pipe and the outer bi-metallic pipe.
Figure 13:
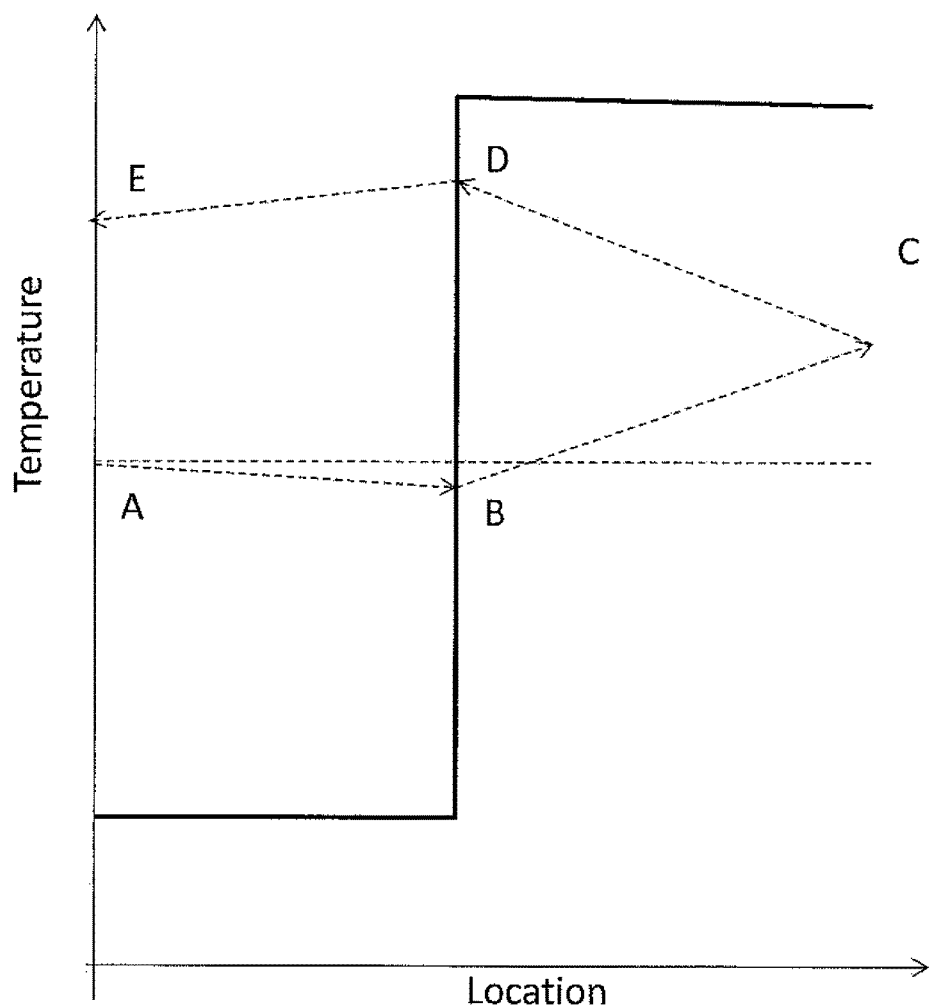
FIG. 13 depicts the temperature variation that a working fluid would experience in the selective heat absorption and rejection pipe designed to absorb heat from the environment if the heat exchanger followed the path depicted in FIG. 7.
Figure 14:
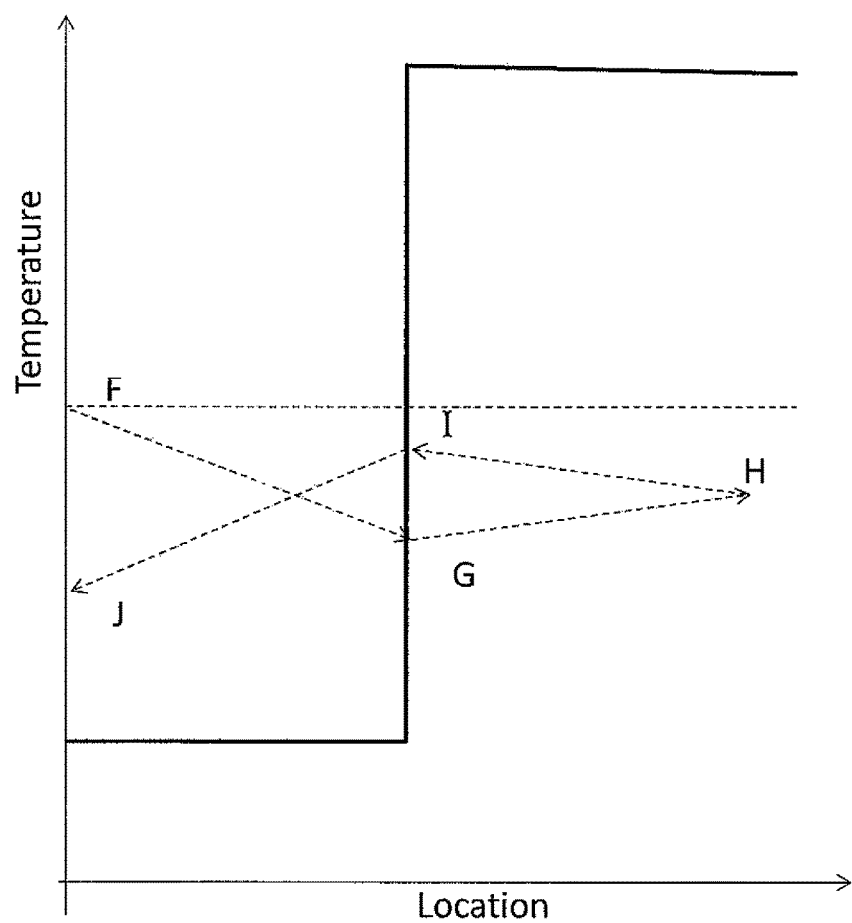
FIG. 14 depicts the temperature variation that a working fluid would experience in the selective heat absorption and rejection pipe designed to reject heat to the environment if the heat exchanger followed the path depicted in FIG. 7.

In the state depicted in FIG. 11, where the inner bi-metallic pipe 82 and the outer bi-metallic pipe 84 are in complete contact with each other; heat transfer between the working fluid 100 and the environment is maximized by elimination of the fluid filled gap 102. FIG. 12 depicts the temperature distribution through the pipe walls 82 and 84 without the fluid filled gap 102.

Referring now to FIG. 1, the four lines of the SHARP heat exchanger 60 (the heat rejection supply line 62, the heat rejection return line 64, the heat absorption supply line 66, and the heat absorption return line 68) are VTRPs. The heat rejection supply line 62 and heat rejection return line 64 are constructed such that the inner bi-metallic pipe 82 expands when heated because the coefficient of thermal expansion of the internal pipe 88 is greater than the coefficient of thermal expansion of the external semi-circular pipe 92. Similarly the outer bi-metallic pipe 84 expands when heated because the coefficient of thermal expansion of the second internal semi-circular pipe 98 is greater than the coefficient of thermal expansion of the second external pipe 94.

The heat absorption supply line 66 and heat absorption return line 68 are constructed such that the inner bi-metallic pipe 82 contracts when heated because the coefficient of thermal expansion of the internal pipe 88 is less than the coefficient of thermal expansion of the external semi-circular pipe 92. Similarly, the outer bi-metallic pipe 84 contracts when heated because the coefficient of thermal expansion of the second internal semi-circular pipe 98 is less than the coefficient of thermal expansion of the second external pipe 94.

The heat transfer behavior of the heat absorption supply line 66 and the heat absorption return line 68 can be compared to a conventional pipe by considering their behavior when deployed in the environment depicted in FIG. 7. In this configuration, a heat absorption supply line 66 is placed along a path that begins at the energy conversion system 20 and first passes through the low temperature area 200 of the environment and subsequently through the high temperature area 250 of the environment.

In the path, the working fluid 100 is forced through the heat absorption supply line 66 starting at point A and subsequently passing through points B and C in the supply line, and D and E in the heat absorption return line 68. When the working fluid 100 leaves the energy conversion system 20, the working fluid is at a temperature approximately equal to the average temperature of the environment. As the working fluid 100 moves through the section of heat absorption supply line 66 between points A and B, where the working fluid is hotter than the ambient temperature, the outer bi-metallic pipe 84 expands in response to a cool ambient temperature.

As the outer bi-metallic pipe 84 expands, the fluid filled gap 102 between the inner and outer bi-metallic pipes increases and fills with the low thermal conductivity fluid 86. The net thermal resistivity of the heat absorption supply line 66 increases and heat transfer between the working fluid 100 and the environment is impeded. Although the working fluid 100 loses some energy to the low temperature area of the environment and the temperature of the working fluid drops, the rate of temperature change is low.

As the working fluid 100 continues through the heat absorption supply line 66 from point B to point C, the outer bi-metallic pipe 84 shrinks in response to the external temperatures in the high temperature area 250 of the environment. As the outer bi-metallic pipe 84 shrinks, the fluid filled gap 102 between the inner bi-metallic pipe 82 and the outer bi-metallic pipe 84 decreases and forces low thermal conductivity fluid 86 from the space between the pipes such that the pipes come into contact with each other. The net thermal resistivity of the heat absorption supply line 66 decreases and enables heat transfer between the working fluid 100 and high temperature area 250 of the environment. The fluid path reverses at point C and the working fluid 100 returns through the high temperature area 250 of the environment in the heat absorption return line 68. The working fluid 100 continues to absorb energy as at the working fluid travels to point D.

As the temperature of the working fluid 100 increases along the path from points B to D, the inner bi-metallic pipe 82 decreases in diameter. As the diameter of the inner bi-metallic pipe 82 decreases, the required external temperature needed to cause the outer bi-metallic pipe 84 to contract and maintain contact with the inner bi-metallic pipe increases. This external temperature requirement serves as a regulating mechanism to prevent heat loss from the working fluid 100 when external temperatures are not sufficiently high.

Between points D and E, where the working fluid 100 is hotter than the ambient temperature, the outer bi-metallic pipe 84 expands in response to the cool ambient temperature. The fluid filled gap 102 size increases and prevents heat loss from the working fluid 100.

The net effect of the thermal resistance variation along the length of the pipe is such that the working fluid 100 returns to the energy conversion system (point E) hotter than when the working fluid left (point A).

The heat transfer characteristics of the heat rejection supply line 62 and the heat rejection return line 64 can be compared to a conventional pipe by considering the operating characteristics of the supply and return line when deployed in the environment depicted in FIG. 7. In this configuration, the heat rejection supply line 62 is placed along a path that begins at the energy conversion system 20 and first passes through the low temperature area 200 of the environment and subsequently through the high temperature area 250 of the environment.

The working fluid 100 is forced through the heat rejection supply line 62 starting at point F and subsequently passing through points G and H in the supply line, and I and J in the heat rejection return line 64. When the working fluid 100 leaves the energy conversion system 20, the working fluid is at a temperature approximately equal to the average temperature of the environment.

As the working fluid 100 moves through the section of heat rejection supply line 62 between points F and G, where the working fluid is hotter than the ambient temperature, the outer bi-metallic pipe 84 shrinks in response to the cool ambient temperature. As the outer bi-metallic pipe 84 shrinks, the fluid filled gap 102 between the inner bi-metallic pipe 82 and the outer bi-metallic pipe 84 decreases and forces low thermal conductivity fluid 86 from the gap and into the channels 104. The net thermal resistivity of the heat rejection supply line 62 decreases when the inner bi-metallic pipe 82 and the outer bi-metallic pipe 84 come in contact with one another and heat transfer is enabled between the working fluid 100 and the low temperature area 200 of the environment.

As the working fluid 100 continues through the heat rejection supply line 62 from point G to point H, the outer bi-metallic pipe 84 expands in response to the high external temperatures of the environment. As the outer bi-metallic pipe 84 expands, the fluid filled gap 102 between the inner bi-metallic pipe 82 and the outer bi-metallic pipe increases and fills with low thermal conductivity fluid 86 drawn in from the channels 104. The net thermal resistivity of the heat rejection supply line 62 increases and impedes heat transfer between the working fluid 100 and the high temperature area 250 of the environment. The fluid path reverses at point H and the working fluid 100 returns through the high temperature area 250 of the environment in the heat rejection return line 64; thereby continuing to absorb energy as the working fluid travels to point I. However, the energy absorption is at a reduced rate.

As the temperature of the working fluid 100 decreases along the path from points G to I, the inner bi-metallic pipe 82 decreases in diameter. As the diameter of the inner bi-metallic pipe 82 decreases, the required external temperature needed to cause the outer bi-metallic pipe 84 to contract and maintain contact is reduced. This external temperature requirement serves as a regulating mechanism to prevent heat absorption into the working fluid 100 when external temperatures are not sufficiently low.

Between points I and J, where the working fluid 100 is hotter than the ambient temperature, the outer bi-metallic pipe 84 contracts in response to the cool ambient temperature. The size of the fluid filled gap 102 decreases until contact is made between the inner bi-metallic pipe 82 and the outer bi-metallic pipe 84, thereby reducing the resistance to heat flow from the working fluid 100 to the environment and enabling heat loss from the working fluid.

The net effect of the thermal resistance variation along the length of the pipe is such that the working fluid 100 returns to the energy conversion system 20 (point J) cooler than when the working fluid left the conversion system (point F).

Figure 15:
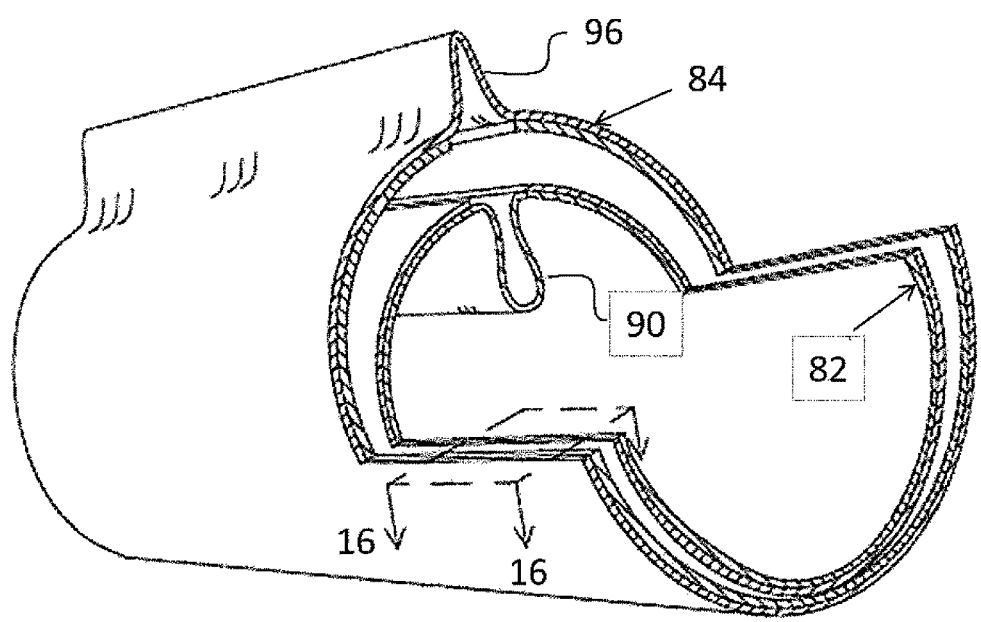
FIG. 15 depicts the segmented selective heat absorption and rejection pipe including flexibility enhancing elastomers with a cross section removed to show an internal structure.
Figure 16:
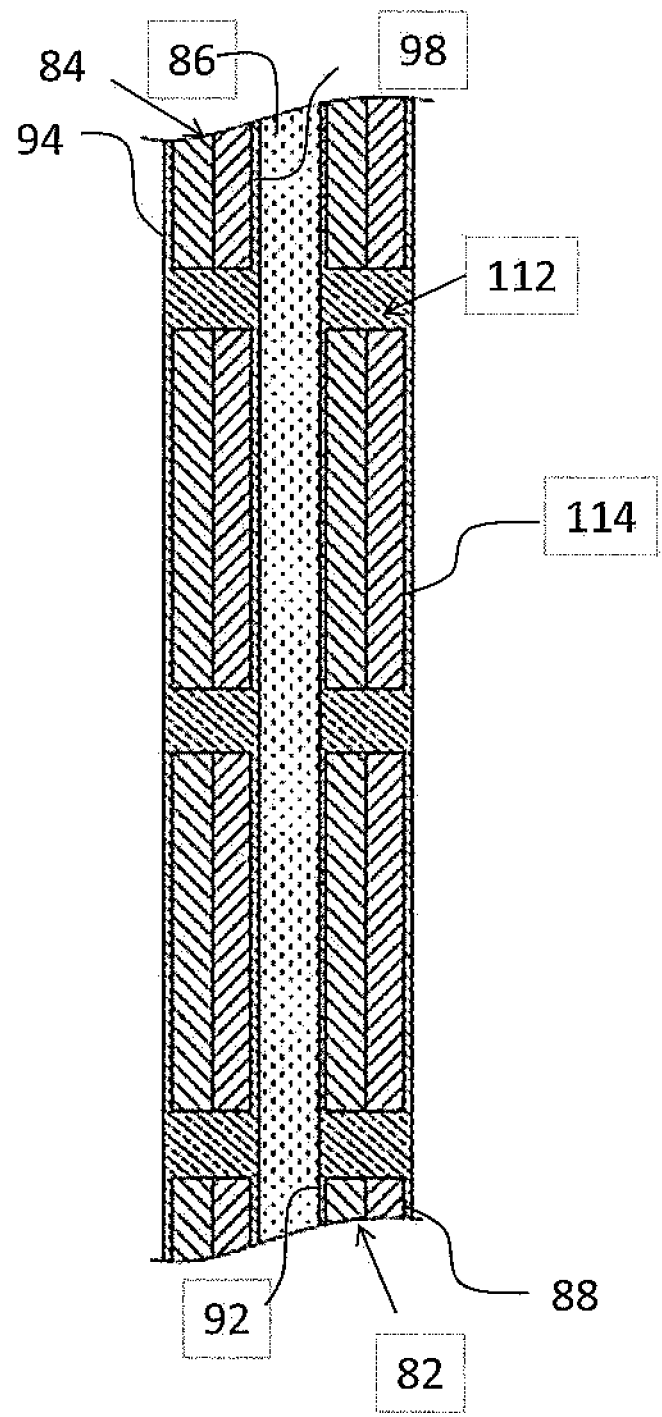
FIG. 16 depicts an enhanced view of the segmented selective heat absorption and rejection pipe including flexibility enhancing elastomers showing the physical relationship of the inner bi-metallic pipe and the outer bi-metallic pipe when embedded in the elastomer.

The bi-metallic pipes of the SHARP heat exchanger 60 can be constructed as continuous rigid pipes if flexibility is not a concern. Alternately, the pipes can be constructed as a flexible structure as shown in FIG. 15 and FIG. 16. FIG. 15 shows a VTRP 80 with segmented bi-metallic pipes with a cross section removed to show the internal structure. To form a flexible pipe structure, the inner bi-metallic pipe 82 and the outer bi-metallic pipe 84 are segmented and embedded in an elastomer 112 with a high thermal conductivity.

FIG. 16 depicts a close-up view of a cross section of the VTRP 110 with segmented construction and with the inclusion of the elastomer 112. Although elastomers typically have low thermal conductivity as compared to metals, the insulating effect of the elastomers is minimized by keeping a surface layer 114 of elastomer to a minimum on the inside and outside of the bi-metallic pipes.

The inclusion of the inward-extending discontinuity 90 and the outward-extending discontinuity 96 in the bi-metallic pipe walls is necessary to allow the pipe to deform under changing thermal conditions. The inclusion of the inward-extending discontinuity 90 and the outward-extending discontinuity 96 also allows the pipe radius to respond to variations in internal and external pressure.

Figure 17:
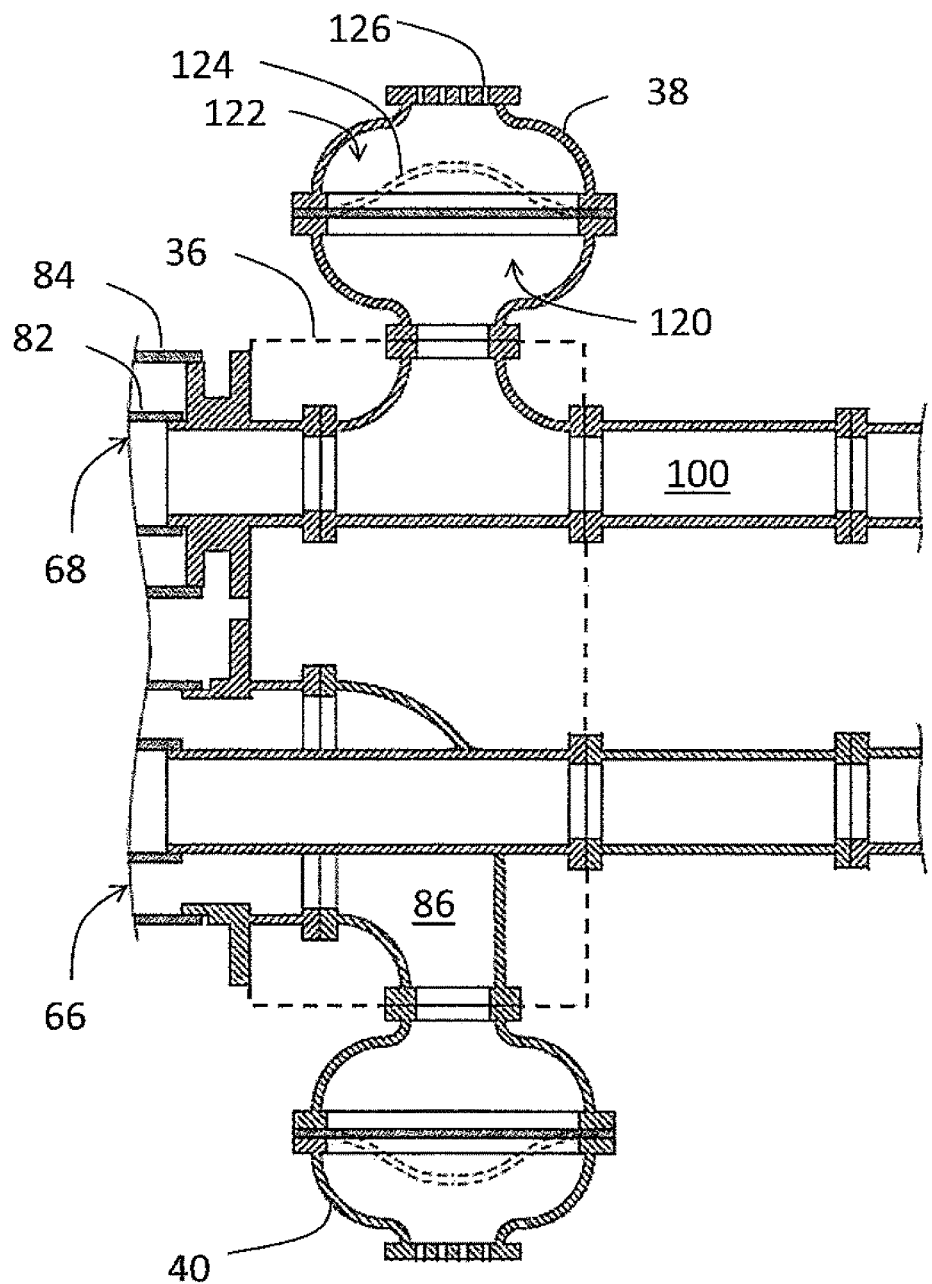
FIG. 17 depicts the structure of the heat absorption line manifold, heat absorption line pressure balance accumulator, heat absorption line low thermal conductivity fluid accumulator as well as a connection of the manifold to the heat absorption supply and return lines and the heat absorbing line circuit pump.

Referring now to FIG. 17, ambient pressure effects are further mitigated by operating the working fluid 100 at an average pressure equal to the ambient pressure. To achieve this pressure balancing, the heat absorption line pressure balance accumulator 38 (vented to the ambient pressure) is attached to the heat absorption return line 68 at the heat rejection line manifold 36 for the working fluid 100 in the heat absorption supply line 66 and heat absorption return line 68 as shown in FIG. 17. The heat absorption line pressure balance accumulator 38 includes a pressure line chamber 120, a vent chamber 122, an elastomeric boundary 124, and a vent port 126.

The elastomeric boundary 124 deflects in response to pressure differences between the working fluid 100 in the heat absorption supply line 66 and the heat absorption return line 68 as well as responding to the pressures in the environment (ambient). Fluid from the environment is drawn in or forced out through the vent port 126 to compensate for motion of the elastomeric boundary 124. Because the elastomeric boundary 124 cannot support a pressure difference, the pressure in the pressure line chamber 120 and vent chamber 122 are equal.

An accumulator of equivalent design and function to the heat absorption line pressure balance accumulator 38 is included for pressure balance between the low thermal conductivity fluid 86 and pressures in the environment (ambient). This heat absorption line low thermal conductivity fluid accumulator 40 is shown in the figure. The heat absorption line low thermal conductivity fluid accumulator 40 also serves as a reservoir for the low thermal conductivity fluid 86 expelled from or drawn into channels 104 as pipe diameters change in response to operating conditions.

The heat absorption line pressure balance accumulator 38 and the heat absorption line low thermal conductivity fluid accumulator 40 are connected to the inner bi-metallic pipe 82 and the outer bi-metallic pipe 84 of the heat absorption supply line 66 as well as the heat absorption line circuit pump 34 through the heat rejection line manifold 36.

The heat rejection line pressure balance accumulator 30, the heat rejection line low thermal conductivity fluid accumulator 32, and the heat rejection line manifold 28, have equivalent designs and function to the heat absorption line pressure balance accumulator 38, the heat absorption line low thermal conductivity fluid accumulator 40, and the heat absorption line manifold 36, respectively.

The energy conversion system 20 can be designed in numerous variations. In the preferred embodiment, the energy conversion system includes a heat engine 22 to convert the recoverable heat energy delivered by the heat absorption return line 68 into mechanical work. The design and operation of a heat engine 22 to convert thermal energy to mechanical work is well known in the art.

In operation, the heat absorption line circuit pump 34 forces the working fluid 100 through the absorption line manifold 36 and into the heat absorption supply line 66. As the working fluid 100 travels through the heat absorption supply line 66 and the heat absorption return line 68 (as part of the SHARP heat exchanger 60) through the low temperature areas 200 of the environment and the high temperature areas 250 of the environment, the working fluid absorbs thermal energy. The working fluid 100 returns to the Stirling engine 22, at a higher temperature than the working fluid left. Inside of the Heat engine 22, heat from the working fluid 100 is absorbed and converted to kinetic energy in the form of rotation of the output shaft 24. The mechanism for conversion of thermal energy to mechanical work in a Heat engine 22 is well known in the art. A by-product of the energy conversion is waste heat that must be transferred back to the environment.

The heat rejection circuit pump 26 forces working fluid 100 through the heat rejection line manifold 28 and into the heat rejection supply line 62. As the working fluid 100 travels through the heat rejection supply line 62 and the heat rejection return line (as part of the SHARP heat exchanger 60) through the low temperature areas of the environment and high temperature areas of the environment, the working fluid rejects thermal energy with the working fluid returning to the Heat engine 22, at a lower temperature than when the working fluid left. Inside of the Heat engine 22, waste heat from the energy conversion process is transferred to the working fluid 100.

Many modifications and variations of the present invention may become apparent in light of the above teachings. A number of alternative devices could be constructed using the same general methods discussed herein to construct devices that would be optimized for a particular purpose. For example: depending on the temperatures of the working fluid 100 the Heat engine 22 can be replaced with an engine based on Ericson or Brayton or Rankine thermodynamic cycles; the outer bi-metallic pipe 84 of the VTRP 80 can be replaced with a solid pipe to improve durability and reduce production cost at the expense of performance; and a gas can be used as the low thermal conductivity fluid 86 in the place of a liquid low thermal conductivity fluid.

In light of the above, it is therefore understood that within the scope of the appended claims, the invention may be practiced otherwise than as specifically described.

What is claimed is:

1. A heat exchanger reactive to external and internal temperatures for carrying a working fluid, said heat exchanger comprising:
    a first pipe having an inner surface and an outer surface and with a first coefficient of thermal expansion, said first pipe having a cross-section with a first channel portion and a first stress relief portion parallel to an axis of said first pipe, said first stress relief portion defining a volume and protruding toward the axis of said first pipe with the volume provided for containing the working fluid within the inner surface thereof;
    a second pipe having an inner surface and an outer surface and with a second coefficient of thermal expansion, said second pipe having a cross section with a second channel portion, said second pipe positioned co-axially with and enclosing said first pipe, the inner surface of said second pipe being in contact with the outer surface of said first pipe as an interference fit, and said second pipe positioned rotationally about said axis of said first pipe relative to said first pipe such the channel portion of said second pipe is rotationally aligned with the channel portion of said first pipe;
    a third pipe having an inner surface and an outer surface and with a third coefficient of thermal expansion, said third pipe positioned parallel to and enclosing said second pipe, with said third pipe having a cross-section with a third channel portion;
    a fourth pipe having an inner surface and an outer surface and with a fourth coefficient of thermal expansion, said fourth pipe having a cross-section with a fourth channel portion and a second stress relief portion parallel to an axis of said fourth pipe with said second stress-relief portion having a volume and protruding away from the axis of said first pipe, said fourth pipe positioned co-axially with and encompassing said third pipe and positioned rotationally about the axis of said third pipe relative to said third pipe such the inner surface of said fourth pipe is in contact with the outer surface of said third pipe with an interference fit; and
    a fluid positioned in the space defined by the inner surface of said third pipe and the outer surface of said second pipe;
    wherein said first and second pipes and said third and fourth pipes have a first position responsive to the internal and external temperatures in which a space defined between said second and third pipes is minimized and a second position responsive to different internal and external temperatures in which the space defined between said second and third pipes is maximized by expansion and contraction of said first pipe, of said second pipe, of said third pipe, and of said fourth pipe in response to differences in coefficients of thermal expansion.

2. The heat exchanger in accordance with claim 1 wherein said first pipe comprises a plurality of segments;
    said second pipe comprises a plurality of second pipe segments;
    said third pipe comprises a plurality of third pipe segments;
    said fourth pipe comprises a plurality of fourth pipe segments; and
    a first set of elastomeric interconnectors joined between adjacent ones of combined said first and second pipe segments; and
    a second set of elastomeric interconnectors joined between adjacent ones of combined said third and fourth pipe segments.

3. The heat exchanger in accordance with claim 1 wherein:
    said first pipe comprises a plurality of first pipe segments;
    said second pipe comprises a plurality of second pipe segments;
    said third pipe comprises a plurality of third pipe segments;
    said fourth pipe comprises a plurality of third pipe segments;
    internal elastomeric encasing having said plurality of combined first pipe segments and said second pipe segments embedded therein for joining adjacent ones of said first pipe segments and said second pipe segments; and
    external elastomeric encasing having said plurality of combined third pipe segments and said fourth pipe segments embedded therein for joining adjacent ones of said third pipe and said fourth pipe segments.

4. The heat exchanger in accordance with claim 1 wherein said fluid positioned in the space formed between said second pipe and said third pipe is a gas.

5. The heat exchanger in accordance with claim 1 wherein the second coefficient of expansion of said second pipe is greater than the first coefficient of thermal expansion of said first pipe and the fourth coefficient of thermal expansion of said fourth pipe is greater than the third coefficient of thermal expansion of said third pipe.

6. The heat exchanger in accordance with claim 1 wherein the second coefficient of expansion of said second pipe is less than the first coefficient of thermal expansion of said first pipe and the fourth coefficient of thermal expansion of said fourth pipe is less than the third coefficient of thermal expansion of said third pipe.

7. The heat exchanger in accordance with claim 1 wherein the second coefficient of expansion of said second pipe is greater than the first coefficient of thermal expansion of said first pipe and the fourth coefficient of thermal expansion of said fourth pipe is less than the third coefficient of thermal expansion of said third pipe.

8. The heat exchanger in accordance with claim 1 wherein the second coefficient of expansion of said second pipe is less than the first coefficient of thermal expansion of said first pipe and the fourth coefficient of thermal expansion of said fourth pipe is greater than the third coefficient of thermal expansion of said third pipe.

9. The apparatus of claim 1 wherein said first stress relief portion and said second stress relief portion are made from an elastomeric material.

\* \* \* \* \*